United States Patent [19]

Bouchemousse

[11] Patent Number: 5,350,609
[45] Date of Patent: Sep. 27, 1994

[54] INSULATING MONOLITHIC REFRACTORY MATERIAL, MANUFACTURING PROCESS AND ARTICLE ACCORDING TO THE PROCESS

[75] Inventor: Jean L. Bouchemousse, Ferriere la Grande, France

[73] Assignee: Vesuvius Crucible Company, Pittsburgh, Pa.

[21] Appl. No.: 851,049

[22] Filed: Mar. 13, 1992

[51] Int. Cl.$^5$ ............................................. B32B 1/08
[52] U.S. Cl. .................................. 428/34.4; 428/34.6; 428/307.3; 428/312.6; 428/318.4; 428/318.6; 428/319.1; 428/688; 428/689; 428/698; 428/699; 428/701; 428/702
[58] Field of Search ............... 428/34.4, 34.6, 446, 428/688, 689, 698, 699, 701, 702, 307.3, 312.6, 318.4, 318.6, 319.1; 222/591, 600, 629

[56] References Cited

U.S. PATENT DOCUMENTS

| | | | |
|---|---|---|---|
| 3,333,746 | 8/1967 | Cope | 222/591 |
| 3,801,083 | 4/1974 | Mantey | 222/591 |
| 4,682,718 | 7/1987 | Watanabe | 222/591 |
| 4,691,844 | 9/1987 | Ishino | 222/591 |
| 4,693,918 | 9/1987 | Fujimoto | 428/318.6 |
| 4,877,705 | 10/1989 | Polidor | 428/699 |
| 4,951,852 | 8/1990 | Rancoule | 428/699 |
| 4,951,929 | 8/1990 | Schwarz | 222/591 |

FOREIGN PATENT DOCUMENTS

| | | |
|---|---|---|
| 0190098 | 1/1986 | European Pat. Off. |
| 0399786 | 5/1990 | European Pat. Off. |
| 1582587 | 8/1968 | France |
| 7536314 | 11/1975 | France |

*Primary Examiner*—Ellis P. Robinson
*Assistant Examiner*—Timothy M. Speer
*Attorney, Agent, or Firm*—Webb Ziesenheim Bruening Logsdon Orkin & Hanson

[57] ABSTRACT

A monolithic composite refractory material has at least one layer of a first dense refractory material and a layer of foamed refractory material bonded thereto. An article having improved thermal insulation properties has an external layer of dense refractory material and an inner core of the foam refractory material bound to the dense material. The refractory material of the dense external layer and foamed material may be fused silica and may contain at least one adjuvant selected from the group consisting of refractory earths, metal oxides and oxide compounds, carbides, borides, silicon oxynitride, sialon and the thermal decomposition products of carboxilanes. The material and articles made therefrom are particularly useful in metallurgical applications.

3 Claims, 1 Drawing Sheet

INSULATING MONOLITHIC REFRACTORY MATERIAL, MANUFACTURING PROCESS AND ARTICLE ACCORDING TO THE PROCESS

BACKGROUND OF THE INVENTION

The invention concerns an insulating refractory material, particularly suited for the manufacture of articles for the transfer of a molten metal, such as troughs, feeding channels, ladles or like vessels, furnace liners and like apparatus. For applications of this type, the thermal conductivity of the refractory material is of primary importance. Heretofore, in order to compensate the heat losses during molten metal transport, the molten metal was superheated to a temperature above that required for its subsequent casting or maintained at the desired casting temperature by supplying heat so that the melt arrives at its destination at the desired temperature. In order to reduce heat losses, currently used transfer elements such as pouring troughs, usually have two layers of thermal insulation applied to the external surfaces thereof.

The existing receptacles and the troughs could be produced of fused or vitreous silica. This material offers numerous advantages. In particular, it is chemically inert relative to numerous molten metals, such as aluminum, copper, steel, zinc and their alloys. The non-wetability of fused silica also makes it possible to avoid the coating or other surface preparation operations that must be provided in the case of most other refractory materials. The relatively low coefficient of thermal expansion also provides fused silica with excellent thermal shock properties. Its excellent cohesion and low porosity precludes the loosening of surface particles by erosion due to the liquid metal.

Nevertheless, a refractory material such as fused silica has a relatively high coefficient of thermal conductivity, on the order of about 0.7 W/mK at a temperature of 700° C., which makes the material unattractive as a transfer surface for molten metal due to the rapid heat loss which occurs therethrough.

SUMMARY OF THE INVENTION

The present invention concerns a monolithic and refractory composite material that retains the above advantages of fused silica, while affording an improvement in thermal insulation properties heretofore lacking in fused silica materials.

The refractory material of the invention is characterized in that it is comprised of at least one layer of a first dense refractory material, and of a layer of cellular or foam refractory material of a second refractory material bound to the layer of dense material.

According to a particular manufacturing mode, the monolithic composite material of the invention is comprised of two external layers of a first dense material, and of a layer of cellular refractory material inserted between the external layers and bound to each of these dense external layers.

The external layer of the dense refractory and/or the layer of cellular refractory material preferably are made from a charge containing at least one adjuvant selected from the group consisting of refractory earths, metal oxides and compounds of metal oxides, carbides, borides, silicon oxynitride, sialon and the thermal decomposition products of carbosilanes. The material of the external layer and/or the material of the cellular material layer are predominately vitreous silica.

The invention also concerns a process for preparing an insulating monolithic refractory composite material, characterized in that a slip mold designed to obtain a dense material is filled, and the slip is allowed to set for a certain time. A portion of the slip that is still liquid is removed by pouring it out of the mold. The mold with the remaining set slip is then filled with the cellular foam to constitute a core.

Finally, the invention concerns an article produced of refractory material, characterized in that the refractory material is the monolithic composite material described above.

BRIEF DESCRIPTION OF THE DRAWINGS

Other characteristics and advantages of the invention will arise from a reading of the following description taken with reference to the attached drawings, in which.

DETAILED DESCRIPTION OF THE INVENTION

Figure 1:
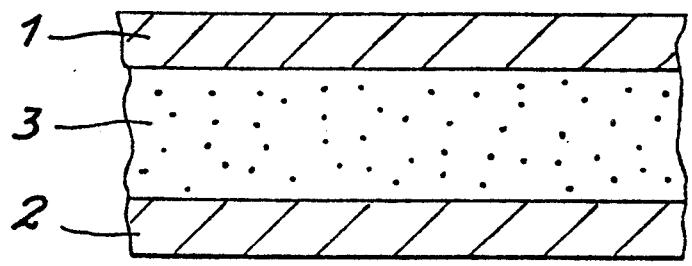
FIG. 1 is a cross sectional fragmentary side view of a segment of the composite material according to the invention.

FIG. 1 is a sectional view of an insulating refractory material according to the invention. The material is a composite comprising external layers 1 and 2 of a dense refractory material and an internal layer 3 of a low density refractory structure. External layers 1 and 2 are of the same dense refractory material, predominantly fused or vitreous silica, and preferably containing at least one adjuvant selected from the group consisting of refractory earths, metal oxides and compounds of metal oxides, carbides, borides, silicon oxynitride, sialon and the thermal decomposition products of carbosilanes. A thermal insulating refractory internal layer 3 of a cellular or foamed refractory material is located between the refractory layers 1 and 2. Layer 3 is generally thicker than layers 1 and 2, and it may be of the same refractory material or a different one than layers 1 and 2. Internal layer 3 is rendered insulating preferably by a conventional foaming process. This foamed material is obtained by any suitable known process, for example, by incorporating a frothing agent in the slip based on powder of the basic refractory material. This foam internal layer 3 is much more thermally insulating than the dense refractory material of layers 1 and 2 due to the entrapped air enclosed within the refractory which provides a cellular structure.

By way of comparison, in the case of fused silica, the thermal conductivity of the dense material of layers 1 and 2 is 0.7 W/mK at 700° C., while the thermal conductivity of the foam layer 3 is less than 0.2 W/mK at 700° C. The total thermal conductivity of the composite material of the invention is naturally dependent on the respective thicknesses of the dense layers 1 and 2 and the foam layer 3. The greater the thickness of the foam in proportion to the total thickness, the lower the thermal conductivity of the composite.

By means of example, a refractory composite material of vitreous silica was produced according to the invention and exhibited an overall thermal conductivity of about 0.25 W/mK at 700° C. Thus, it can be observed that the refractory composite material of the invention is approximately three times more insulating than the dense fused silica.

The composite material is preferably produced by first filling a mold with a slip of the dense material and allowing this dense slip to set for a certain length of time. A solid, or at least a pasty layer, which will later become the dense layer 1, is formed on the inner walls of the mold, while the central part of the slip remains liquid. The slip that remains in liquid form in the mold is then poured out. The mold is next filled with the foamed cellular slip to form the insulating core 3 of the composite material. Because the dense layer is not yet set, a strong mechanical and chemical/ceramic bond is effected between the dense layer and the cellular core 3 by interpenetration of the material of the dense layer into the open pore structure of the insulating core 3 along the interface therebetween. This bonding action between the dense layers 1 and 2 and cellular core 3 makes it possible to obtain a monolithic composite material of superior strength and toughness.

The composite shape comprising the dense outer layers 1 and 2 and the foam inner core 3 is allowed to set. The composite is then ejected from the mold to obtain the raw or green article, which is then sintered by firing to obtain a hard refractory article of desired shape. The sintering also fixes the ceramic bond between the external dense layers and the inner cellular core.

The invention makes it possible to obtain slip cast articles of simple form, such as plates, cylinders or more complex shapes such as troughs, liners and transfer ladles. The fired material has a smooth outer surface that does not crumble and resists corrosion and erosion by molten metals.

The present invention is particularly applicable for the production of troughs for foundry practice. It can also be applied to the production of articles that require high mechanical strength properties in association with excellent thermal insulation properties, for example, shaped articles for lining a heat-treating furnace.

Figure 2:
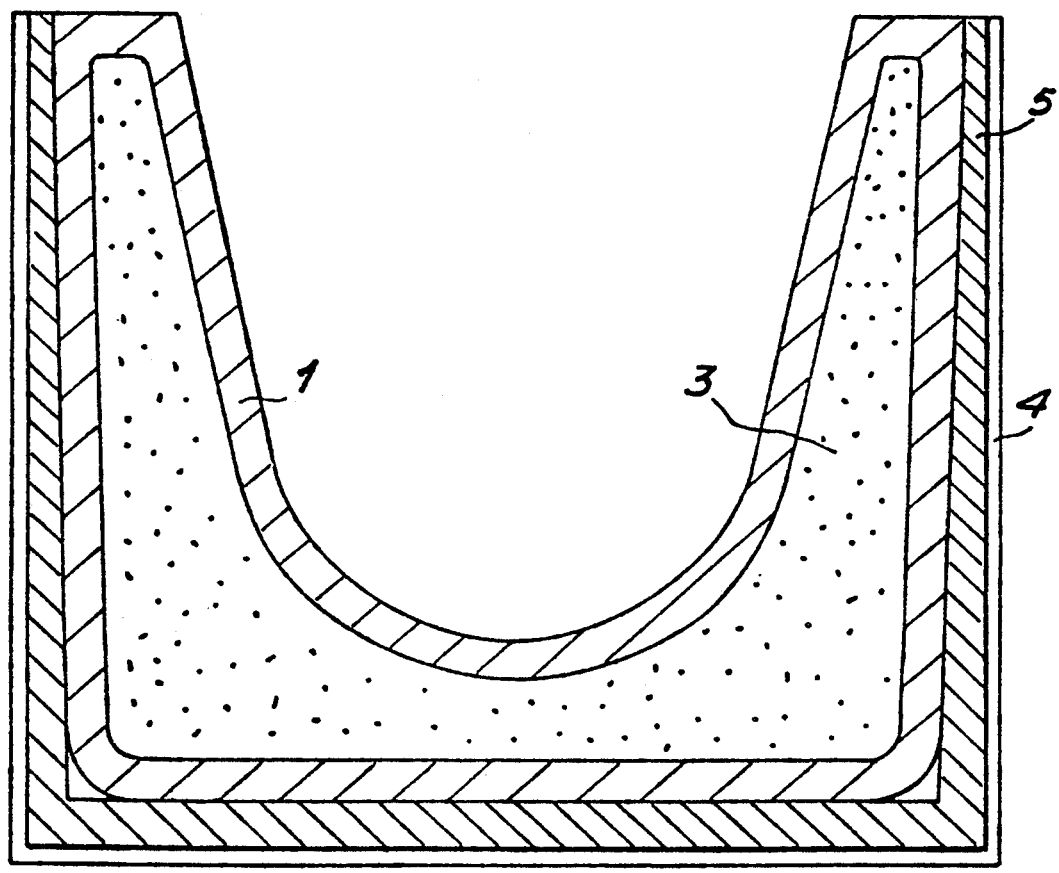
FIG. 2 is a cross sectional view of a pouring trough for molten metal produced of a material according to the invention.

By way of further example, FIG. 2 shows a cross section of a pouring trough for casting aluminum. The composite structure comprises an external layer 1 of dense vitreous silica, surrounding a silica foam inner core 3 that provides thermal insulation to the composite trough. In use, the trough is usually mounted in a supporting metal body 4. A layer of ceramic fibers 5 is located between the metal body 4 and the trough to act as a buffer zone to accommodate the differences in the coefficients of thermal expansion between the metal body 4 and the refractory trough.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A refractory article for use in conveying molten metal comprising at least one molten metal contacting layer of a dense refractory material comprising fused silica having a thermal conductivity of about 0.7 W/mK at 700° C. and a layer of refractory foam material comprising fused silica having a thermal conductivity of less than about 0.2 W/mK at 700° C. bonded by a fired ceramic bond to said dense refractory layer.

2. The refractory article of claim 1, wherein said dense refractory layer forms an outer surface of said article and said foam refractory layer forms an inner core of said article, said article having an overall thermal conductivity across said dense and foam refractory layers of about 0.25 W/mK at 700° C.

3. The refractory article of claim 1 comprising a pouring trough for casing molten metal.

* * * * *